Dec. 22, 1970   J. VAN BROEKHOVEN   3,549,552
CALCIUM HALOPHOSPHATE "DAYLIGHT" PHOSPHOR
Filed Jan. 27, 1969
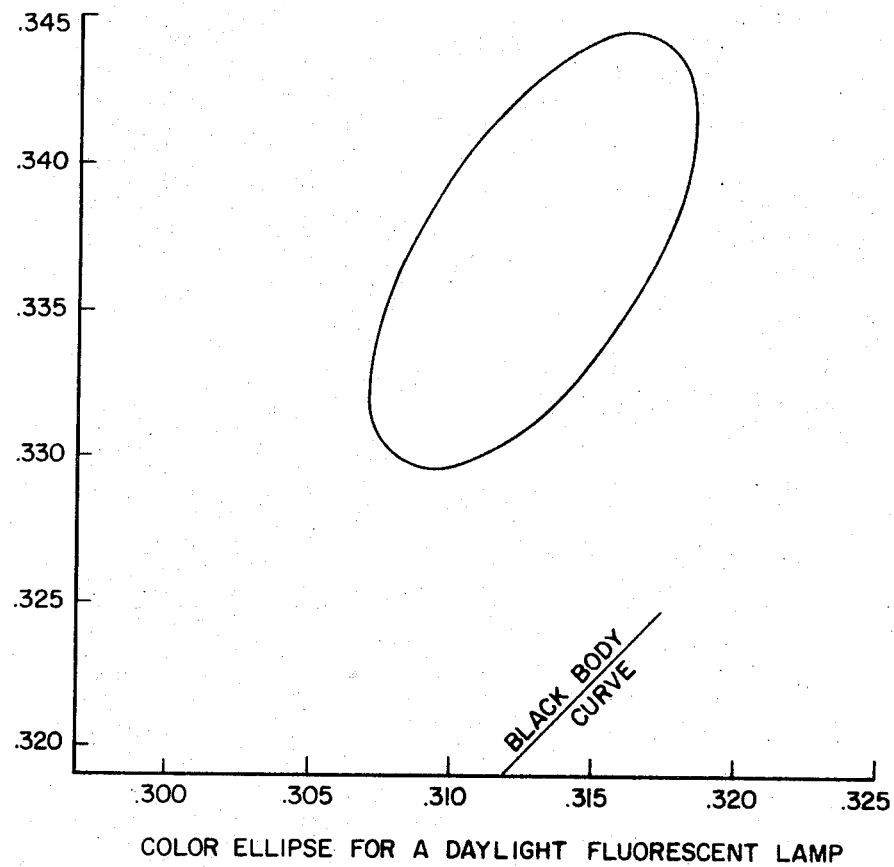
COLOR ELLIPSE FOR A DAYLIGHT FLUORESCENT LAMP
WITNESSES
INVENTOR
Jacob Van Broekhoven
BY
ATTORNEY

United States Patent Office 3,549,552
Patented Dec. 22, 1970

3,549,552
CALCIUM HALOPHOSPHATE "DAYLIGHT"
PHOSPHOR
Jacob Van Broekhoven, North Caldwell, N.J., assignor to
Westinghouse Electric Corporation, Pittsburgh, Pa., a
corporation of Pennsylvania
Filed Jan. 27, 1969, Ser. No. 794,180
Int. Cl. C09k 1/36
U.S. Cl. 252—301.4                    2 Claims

ABSTRACT OF THE DISCLOSURE

Halophosphate phosphor of particular formulation, when used as the sole phosphor component in a fluorescent lamp, causes the operating lamp to exhibit a "daylight" color. The ratio of metal to phosphorus in the phosphor is quite low, as compared to other commercial halophosphates of different emission colors.

BACKGROUND OF THE INVENTION

This invention relates to phosphor material and, more particularly, to a halophosphate phosphor of particular formulation, which when used as the sole phosphor component in a fluorescent lamp causes the operating lamp to exhibit a "daylight" color.

Halophosphate phosphor materials are, and have been for many years, the primary phosphor component of fluorescent lamps. Such lamps are designed to exhibit different colors during operation, and the colors are specified by so-called color ellipses as plotted on an I.C.I. color diagram, with the color ellipses being established for the industry. Most of the commercial colors such as "cool white," "white," etc. are achieved by a single halophosphate phosphor, with the varying colors normally obtained by varying the relative constituents which comprise the phosphor. By way of further explanation, and as is well known, halophosphate phosphor has the general chemical structure of the naturally occurring mineral apatite and can be represented by the formula:

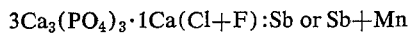

Alternatively, the phosphor can be represented by the formulation

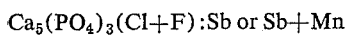

In this phosphor, up to 0.2 mole of calcium may be replaced by an equal molar amount of cadmium.

In contrast to many other colors of commercially available fluorescent lamps, the so-called "daylight" lamp has normally required a blend of two or more phosphor materials in order to achieve the desired color for the operating lamp. Some of these blends have comprised a mixture of calcium tungstate plus bluish white halophosphate, or cool white halophosphate plus calcium tungstate plus magnesium tungstate, or cool white halophosphate plus barium titanium phosphate plus calcium tungstate, or pink halophosphate plus blue halophosphate. The foregoing blends were normally used instead of a single component halophosphate phosphor formulation since the single component formulations were too low in relative output when designed to cause the operating lamp to exhibit a daylight color. All of these previous halophosphate phosphors were compounded to exhibit a ratio of gram atoms of total calcium plus manganese plus cadmium to three phosphorous atoms which was normally greater than about 4.70, and usually was considerably higher, even approaching the theoretical ratio of 5:3.

SUMMARY OF THE INVENTION

It is the general object of this invention to provide a single component calcium halophosphate phosphor which when used as the sole phosphor component in a fluorescent lamp causes the operating lamp to exhibit a daylight color.

The foregoing object of the present invention, and other objects which will become apparent as the description proceeds, are achieved by providing halophosphate phosphor of particular formulation which is most unusual in that the gram atom ratio of calcium plus manganese plus cadmium taken with respect to three gram atoms of phosphorus in the phosphor is from about 4.30 to 4.6.

BRIEF DESCRIPTION OF THE DRAWING

For a better understanding of the invention, reference should be made to the sole figure which sets forth the color ellipse for a fluorescent lamp of so-called "daylight" color.

DESCRIPTION OF THE PREFERRED EMBODIMENT

In order to prepare the single component phosphor which will cause the operating fluorescent lamp to exhibit a daylight color, as shown in the figure, there are admixed 3.0 moles CaHPO$_4$, 1.076 moles CaCo$_3$, 0.330 mole CaF$_2$, 0.034 mole Mn (as MnCO$_3$), 0.06 mole Cd (as CdCO$_3$), 0.03 mole Sb$_2$O$_3$, and 0.20 mole NH$_4$Cl. The foregoing raw mix is fired for three hours in an open firing tray which is surrounded by nitrogen atmosphere at a temperature of from about 1180° C. to 1190° C. These firing conditions are generally conventional for halophosphate phosphors. During the firing, some phosphorous is lost to the atmosphere along with some chlorine, antimony and cadmium. For the foregoing example, the relative constituents of the final phosphor are such that the atom ratio of calcium plus manganese plus cadium to three phosphorous atoms is about 4.56, the ratio of atoms of manganese to three phosphorus atoms is about 0.03, the ratio of atoms of antimony to three phosphorous atoms is about 0.032, the ratio of atoms of fluorine to three phosphorous atoms is about 0.65, and the ratio of atoms of chlorine to three phosphorous atoms is about 0.07.

In order to cause the phosphor to exhibit such emission when incorporated into a fluorescent lamp so that the operating lamp will exhibit the desired "daylight" color, the phosphor, which has the general formulation

wherein up to 0.2 mole of calcium may be replaced by cadmium, is compounded so that the following relative gram atom proportions of the constituents, taken with respect to phosphorus, are obtained in the final material: the gram atom ratio of Ca+Mn+Cd/3P is from about 4.30 to 4.6, the gram atom ratio of Mn/3P is from about 0.028 to 0.042, the gram atom ratio of Sb/3P is from 0.03 to 0.125, the gram atom ratio of F/3P is from about 0.56 to 0.84, and the gram atom ratio of Cl/3P is from about 0.04 to 0.15. The unusual aspects of the foregoing formulation are the relatively low gram atom ratio of metal to phosphorous.

From a commercial standpoint, it is much simpler to fabricate a single component phosphor than to blend different phosphor components, in order to achieve a desired color. In addition, as the lamp is operated, different characteristics in maintenance of initial light output for the different phosphor components can result in color shifts for the operating lamps. This difficulty of course is avoided when using a single component instead of a blend of different phosphors. In addition, the present single component "daylight" halophosphate phosphor has an output which is slightly superior to the previous "daylight" phosphor blends.

It will be recognized that the object of the invention has been achieved by providing halophosphate phosphor, which when used as the sole phosphor component in a fluorescent lamp, causes the operating lamp to exhibit a daylight color.

While a preferred embodiment of the invention has ben illustrated and described in detail, it is to be particularly understood that the invention is not limited thereto or thereby.

I claim as my invention:

1. A halophosphate phosphor which when used as the sole phosphor component in a fluorescent lamp causes the operating lamp to exhibit a daylight color, said phosphor having the general formulation $$Ca_{<4.6}(PO_4)_3(Cl+F_{<1}:Sb, Mn$$

wherein up to 0.2 atom of Ca may be replaced by Cd, the ratio of Ca+Mn+Cd/3P is from about 4.30 to 4.6, the ratio of Mn/3P is from about 0.028 to 0.042, the ratio of Sb/3P is from 0.03 to 0.125, the ratio of F/3P is from about 0.56 to 0.84, and the ratio of Cl/3P is from about 0.04 to 0.15.

2. The halophosphate phosphor as specified in claim 1, wherein cadmium is present in such amount as to replace 0.06 atom of Ca, the ratio of Ca+Mn+Cd/3P is about 4.56, the ratio of Mn/3P is about 0.03, the ratio of Sb/3P is about 0.032, the ratio of F/3P is about 0.65, and the ratio of Cl/3P is about 0.07.

References Cited

UNITED STATES PATENTS

| | | | |
|---|---|---|---|
| 3,109,819 | 11/1963 | Gillooly et al. | 252—301.4 |
| 3,470,108 | 9/1969 | Ropp | 252—301.4 |

TOBIAS E. LEVOW, Primary Examiner

R. D. EDMONDS, Assistant Examiner

U.S. Cl. X.R.

252—301.4